United States Patent
Shao

(10) Patent No.: US 9,209,688 B2
(45) Date of Patent: Dec. 8, 2015

(54) CONTROLLING CURRENT IN A SWITCHING REGULATOR

(71) Applicant: ANALOG DEVICES GLOBAL, Hamilton (BM)

(72) Inventor: Bin Shao, Shanghai (CN)

(73) Assignee: ANALOG DEVICES GLOBAL, Hamilton (BM)

( * ) Notice: Subject to any disclaimer, the term of this patent is extended or adjusted under 35 U.S.C. 154(b) by 249 days.

(21) Appl. No.: 13/791,240

(22) Filed: Mar. 8, 2013

(65) Prior Publication Data

US 2014/0253083 A1    Sep. 11, 2014

(51) Int. Cl.
*H02M 3/156* (2006.01)
*H02M 3/157* (2006.01)
*H02M 1/32* (2007.01)
*H02M 1/00* (2007.01)

(52) U.S. Cl.
CPC ............... *H02M 3/157* (2013.01); *H02M 1/32* (2013.01); *H02M 2001/0009* (2013.01); *H02M 2001/0035* (2013.01)

(58) Field of Classification Search
CPC ............. H02M 2001/0025; H02M 2001/0009; H02M 3/156; H02M 1/32
See application file for complete search history.

(56) References Cited

U.S. PATENT DOCUMENTS

| | | | |
|---|---|---|---|
| 2007/0236971 A1* | 10/2007 | Chen | 363/56.01 |
| 2009/0212851 A1* | 8/2009 | Yamashita et al. | 327/538 |
| 2011/0133711 A1* | 6/2011 | Murakami et al. | 323/282 |
| 2012/0161728 A1 | 6/2012 | Chen et al. | |
| 2012/0181999 A1* | 7/2012 | Weng | 323/282 |
| 2012/0268094 A1 | 10/2012 | Scaldaferri et al. | |

OTHER PUBLICATIONS

Analog Devices, "ADP2386: 20 V, 6 A, Synchronous Step-Down CD-to-DC Regulator Data Sheet," 2012, 24 pages. Available at: http://www.analog.com/static/imported-files/data_sheets/ADP2386.pdf (accessed on Jan. 14, 2013), Nov. 2012.
Analog Devices, "ADP2323: Dual 3 A, 20 V Synchronous Step-Down Regulator with Integrated High-Side MOSFET Data Sheet," Jun. 2012 , 32 pages. Available at: http://www.analog.com/static/imported-files/data_sheets/ADP2323.pdf (accessed on Jan. 14, 2013).

* cited by examiner

*Primary Examiner* — Harry Behm
(74) *Attorney, Agent, or Firm* — Knobbe, Martens, Olson & Bear LLP

(57) ABSTRACT

In one aspect, this disclosure relates to a method of controlling current output from a switching regulator to a load via an inductor. Inductor current information can be sampled at a peak level, such as just before a transistor configured to cause current to flow through the inductor is turned off. The sampled inductor current can be compared with a reference current, and a current limit threshold can be adjusted based on the comparison. The output current of the switching regulator can be controlled based on a comparison of the current limit threshold with an indicator of current flowing through the inductor. This method can accurately and efficiently limit current in a switching regulator.

19 Claims, 7 Drawing Sheets

CONTROLLING CURRENT IN A SWITCHING REGULATOR

BACKGROUND

1. Technical Field

Embodiments of the invention relate to electronic devices, and, more particularly, to switching regulators.

2. Description of the Related Technology

A switching regulator can generate a regulated voltage. For example, the switching regulator can include one or more switches that are turned on and off. The duty cycle of the switches can be controlled to control the regulated voltage. Examples of switching regulators include, for example, buck converters and boost converters.

A switching regulator can have a maximum power specification and/or a maximum current specification. A switching regulator should protect itself from delivering too much power or current, which can cause permanent damage to the switching regular. In addition, current regulation can be used to regulate the current being provided to a load device, such as a light emitting diode. As maximum current specifications increase, larger devices are being used in the switching regulator to provide higher currents, sense the higher currents, and limit the higher currents from exceeding the maximum current specification. Moreover, the accuracy of sensing a maximum current can be more significant because more accurate current sensing can lead to a reduction in the size of devices in the switching regulator. The higher maximum currents can also lead to greater power dissipation by the switching regulator.

Accordingly, there is a need for improved switching regulators.

SUMMARY

One aspect of this disclosure is an electronically-implemented method of current limiting. The method includes sampling a signal associated with an inductor current of a switching regulator to generate a sampled level, in which timing of sampling is performed relative to one of switching on or off of a transistor configured to pass current through an inductor to a load. The method also includes adjusting a current limit threshold based at least partly on a comparison between the sampled level and a reference level. The method further includes limiting an output current of the switching regulator based at least partly on a comparison between the current limit threshold and the signal.

In certain embodiments, the comparison between the current limit threshold and the signal can be performed by a current limiting comparator. According to some of these embodiments, the method can also include generating a control signal based on a node in a signal path between the current limiting comparator and a control terminal of the transistor, wherein said sampling occurs when the control signal is asserted. For instance, a level shifter and/or a driver can be between the node and the current limiting comparator.

According to some embodiments, the method can include disabling at least a portion of a current adjustment circuit configured to perform the adjusting, in response to detecting that the output current of the switching regulator is not being limited based on the current limit threshold. Alternatively or additionally, the method can include latching data indicative of a result of the comparison between the sampled level and the reference level in a clock cycle after the adjusting. The adjusting and the limiting can cause the switching regulator to operate in a dynamic stable state to limit the output current of the switching regulator in various embodiments. The sampled level can stored via a capacitive circuit element according to some embodiments.

Another aspect of this disclosure is a switching regulator that includes a current limiting comparator, a compare circuit, and a current adjustment circuit. The current limiting comparator is configured to perform a comparison of a current limit threshold with an indication of current passing through an output circuit element of the switching regulator. The current limiting comparator is configured to cause the current passing through the output circuit element of the switching regulator to be limited based on the comparison. The compare circuit is configured to compare a reference current with a stored indication of current flowing through the output circuit element. The current adjustment circuit is configured to adjust the current limit threshold based on an output of the compare circuit.

The switching regulator can be, for example, a buck converter. According to certain embodiments, the switching regulator includes a state element configured to latch an output of the current limiting comparator, a level shifter configured to increase a voltage level of an output of the state element, and one or more drivers configured to receive an input from the level shifter and control activation of a transistor that is configured to cause current to pass through the output circuit element. The output circuit element can be, for example, an inductor.

The current adjustment circuit can include a counter or an analog-to-digital converter in some embodiments. The current adjustment circuit can be configured to generate an output with a dynamic stable state to cause current passing through the output circuit element to be limited according to certain embodiments. Alternatively or additionally, the current adjustment circuit can be disabled in response to the current limiting comparator generating an output signal indicative of the current limit threshold being greater than the indication of current flowing through the output circuit element.

In some embodiments, the switching regulator can include a storage element configured to store the indication of the current flowing through the output circuit element when a control signal is asserted. The control signal can be generated from a node in a signal path between the current limiting comparator and the output circuit element according to certain embodiments. The switching regulator can include a switch configured to selectively enable the storage element to store the indication of current passing through the output circuit element based on the control signal according to various embodiments.

Another aspect of this disclosure is an apparatus that includes means for sampling an indication of current passed through an inductor; means for adjusting a current limit threshold based on comparing a reference current and the sampled indication of current flowing through the inductor; and means for limiting current passed through the inductor based on the current limit threshold.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF EMBODIMENTS

Figure 1:
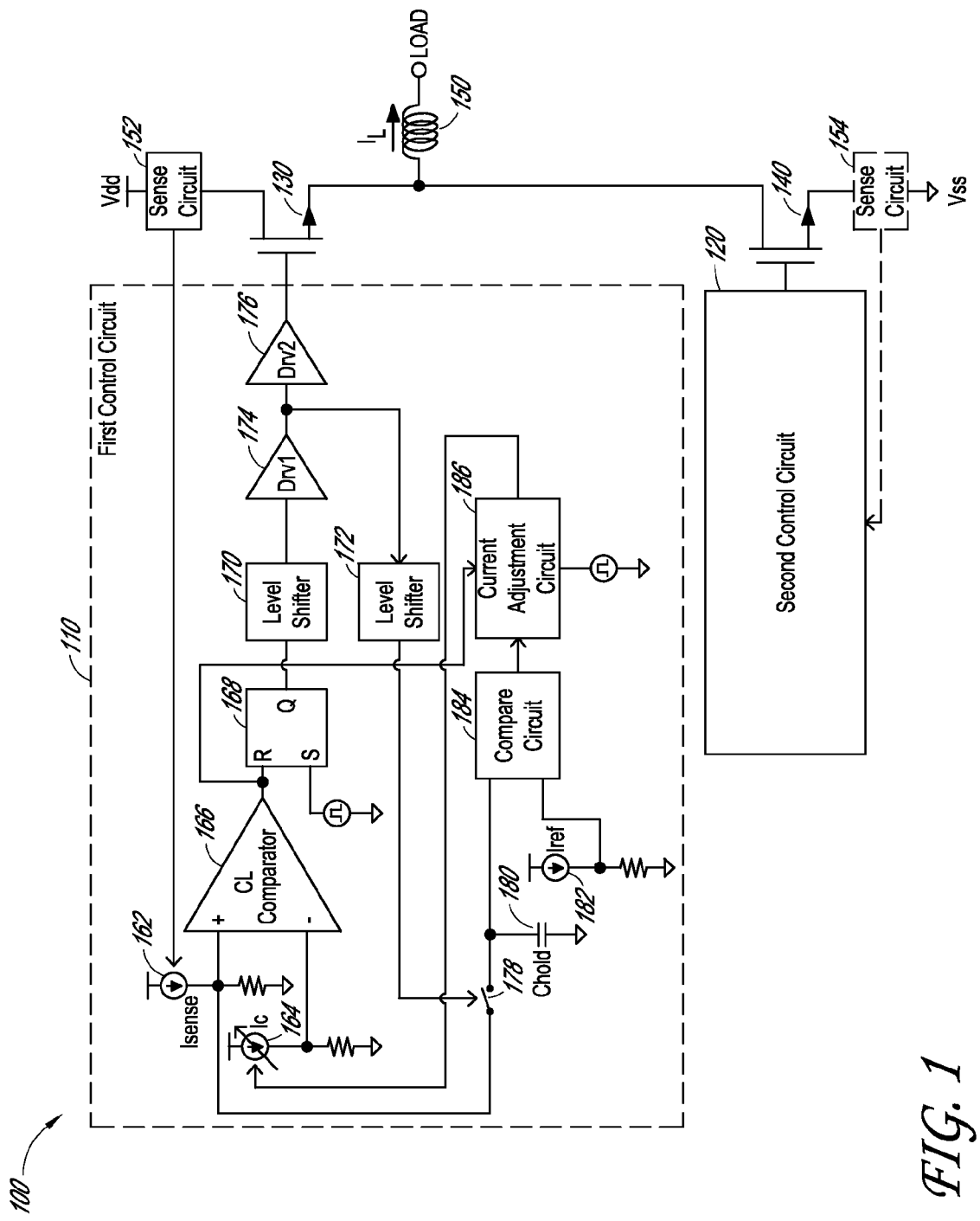
FIG. 1 is a circuit diagram of an embodiment of a switching regulator.

The following detailed description of embodiments presents various descriptions of specific embodiments of the inventions. However, the inventions can be embodied in a multitude of different ways as defined and covered by the claims. In this description, reference is made to the drawings where like reference numerals may indicate identical or functionally similar elements.

As discussed above, an output power provided by a switching regulator to a load can be controlled such that the output power stays within the bounds of an output power specification. For example, the output current can be limited such that the output current does not exceed a maximum current specification. This can prevent damage to the switching regulator and/or prevent the output current from damaging the load that receives the output current.

Accurately limiting output current can have a more significant impact on power consumption of the switching regulator as the maximum current specification increases. For instance, the size of an inductor though which current flows to generate the regulated voltage can be larger to deliver more current. According to some existing design methods and trimming, a current limit threshold direct current (DC) value can be set accurately. However, the accuracy of an output current limiting circuit can be limited due to the delay of a current limiting comparator, which can compare the current limit threshold to a sensed inductor current, and one or more other circuit elements in a signal path between the current limiting comparator and a transistor that causes current to flow through the inductor. Such a propagation delay can be about 20 nanoseconds (ns) in some applications. In an illustrative example with a buck converter, a switching regulator can receive a 20 volt (V) input and generate a 1 V output via a 1 microhenry (μH) inductor. The 20 ns propagation delay can cause a 0.4 Ampere (A) error in one example. Accordingly, there is a need to reduce such an error. Moreover, even to obtain the propagation delay to 20 ns, the switching regulator can burn a significant amount of quiescent current for the biasing of the comparator. Advantageously, minimizing and/or reducing the current error induced by the propagation delay while consuming a relatively small quiescent current can be achieved in accordance with the principles and advantages described herein.

FIG. 1 is a circuit diagram of an embodiment of a switching regulator 100. While illustrated in the context of a buck converter, the principles and advantages described herein are also applicable to other types of switching regulators, such as boost converters, buck-boost converters, and Cuk converters. The switching regulator 100 can generate a regulated voltage for a load. As illustrated, the switching regulator 100 includes a first control circuit 110, a second control circuit 120, a first switch 130, a second switch 140 for synchronous rectification, an output circuit element 150, a first sense circuit 152, and an optional second sense circuit 154. The switching regulator 100 with the exception of the output circuit element 150 can be implemented as an integrated circuit in certain applications. The output circuit element 150 can be an external inductor. Such an inductor can be physically large relative to the other circuit elements shown in FIG. 1. Accordingly, the inductor can be external to the integrated circuit that includes the remainder of the switching regulator 100. In some implementations, the inductor can be external to a package in which the integrated circuit that includes the remainder of the switching regulator 100 is encapsulated. The output circuit element 150, for example, an inductor, can function as an energy storage element.

The switching regulator 100 can rapidly switch the first switch 130 on and off. Similarly, the switching regulator 100 can rapidly switch the second switch 140 off and on. The first switch 130 is typically either fully conducting or switched off. Likewise, the second switch 140 is typically either fully conducting or switched off. Accordingly, the switches 130 and 140 should spend relatively little time in a high dissipating transition between fully conducting and being switched off, which results in relatively high efficiency. The first switch can be coupled to Vdd and provide an electrical path between Vdd and an inductor when switched on. The second switch can be coupled to Vss and provide an electrical path between Vss and the inductor when switched on.

The amount of time that each of the switches 130 and 140 is on can determine how much current is transferred to a load via the output circuit element 150. The regulated voltage provided to the load can be adjusted by varying a ratio of time that the first switch 130 is on and the second switch 140 is off to the time that the first switch 130 is off and the second switch 140 is on. This ratio of time can be referred to as the duty cycle. The switches 130 and 140 can be power field effect transistors (FETs). In the illustrated embodiment, the first switch 130 is an NMOS field effect transistor and the second switch 140 is also an NMOS field effect transistor. In an alternative embodiment, the second switch 140 can be implemented by a diode. In an alternative embodiment, the first switch 130 is a PMOS field effect transistor. More generally, the switches 130 and 140 can each comprise an insulated gate FET. It will be understood that these FETs can have gates made out of materials other than metals, such as polycrystalline silicon, and can have dielectric "oxide" regions made from dielectrics other than silicon oxide, such as from silicon nitride or high-k dielectrics.

The first control circuit 110 can control whether the first switch 130 is either fully conducting or switched off. The first control circuit 110 can monitor an indication of the current output to the load via the first switch 130 and compare the indication to a reference, such as a reference current and adjust a current limit threshold based on the comparison. As illustrated in FIG. 1, the first control circuit 110 can include a sense current source 162, a current limit threshold current source 164, a current limiting comparator 166, a latch 168, level shifters 170 and 172, drivers 174 and 176, a switch 178, a storage element 180, a reference current source 182, a compare circuit 184, and a current adjustment circuit 186. The first control circuit 110 can include more or fewer components than illustrated in FIG. 1 in some implementations. For instance, in certain embodiments, the level shifters 170 and 172 may not be included in the first control circuit 110.

A sense circuit 152 can sense an amount of current flowing through the output circuit element 150 via the first switch 130. While drawn as a 3-terminal block, the sense circuit 152 can have fewer or more terminals, such as 2 terminals. The sense circuit 152 can include any suitable circuit elements configured to sense current flowing through the output circuit element 150 via the first switch. For instance, the sense circuit 152 can include a resistor in series between a power rail voltage and a drain of the first switch 130. In this example, the sense circuit 152 can also include a circuit configured to detect a voltage across the resistor to sense the amount of current flowing through the output circuit element 150 via the first switch 130. In another example, the sense circuit 152 and the sense current source 162 can combine to form a current mirror. The sense circuit 152 can correspond to a diode-connected transistor portion of the current mirror, such as a PMOS transistor having a gate connected to a drain. The source of the PMOS transistor can be electrically coupled to the unregulated power rail, and the gate/drain electrically coupled to the sense current source 162 and to the first transistor 130. Of course, there can be scaling within the devices of a current mirror so that the sensed inductor current within the first control circuit 110 can be of a different magnitude, such as a much smaller magnitude, than the actual inductor current. The sense current source 162 can receive an output of the sense circuit 152 and generate a current that is indicative of an amount of current flowing through the output circuit element 150. The sense current source 162 can comprise a current source portion of a current mirror, a current controlled current source, a voltage-controlled current source, or the like. Other forms of current sensing will be readily determined by one of ordinary skill in the art.

The current limiting comparator 166 can compare a current limit threshold generated by the current source 164 with an indication of current flowing through the output circuit element 150 generated by the sense current source 162. For example, the sensed current from the sense current source 162 can be converted to a voltage by passing current through a resistance, and the voltage provided as an input to a non-inverting input of the current limiting comparator 166. An inverting input of the current limiting comparator 166 can be coupled to a reference as will be discussed later. When the voltage at the non-inverting input of the current limiting comparator 166 exceeds that of the inverting input, the output of the current limiting comparator 166 goes high. Otherwise, the output of the current limiting comparator 166 is low. The current limiting comparator 166 can indirectly generate an output indicative of whether the current flowing through the output circuit element 150 is greater than the current limit threshold. This output can control whether the first switch 130 should be switched on or switched off. Accordingly, the output of the current limiting comparator 166 can control the current that flows through the output circuit element 150. The output of the current limiting comparator 166 can be latched by the latch 168. In the illustrated embodiment, the latch 168 corresponds to an SR latch with the output of the current limiting comparator 166 coupled to the reset (R) input of the latch 168. When the output of the current limiting comparator 166 goes high, this resets the latch 168 such that the output (Q) of the latch goes low. The latch 168 can be set such that the output (Q) is high in response to a pulse or a clock signal applied as an input to a set input (S). An output signal of the latch 168 can be shifted to a higher voltage level by the level shifter 170 during a following clock cycle. According to some implementations, the level shifter 170 can shift the output signal of the latch 168 to a different domain, such as an analog domain or a power domain. An output of the level shifter 170 can be provided to a control terminal, such as a gate, of the first switch 130 via drivers 174 and 176. In this way, the output of the latch 168 can control whether the first switch 130 is switched on or switched off.

An output of the first driver 174 can be shifted to a lower voltage level by the level shifter 172. According to some implementations, the level shifter 172 can shift the output signal of the first driver 174 to a different domain, such as an analog domain or a power domain. An output of the level shifter 172 can be provided to the switch 178. Accordingly, the switch 178 can be activated in response to the output of the level shifter 172. As such, the output of the level shifter 172 can activate the switch 178 such that the indication of current flowing through the output circuit element 150 generated by the sense current source 162 can be sampled by the storage element 180, such as a capacitor, relatively shortly before the first switch 130 is turned off. As described earlier in connection with the sensed current, the sampled current can also be scaled (and also converted to a voltage). As the inductor current rises when the first switch 130 is on (see FIG. 4A), the sampling can be relatively accurate in observing the maximum current flowing through the output circuit element 150, as the sampling occurs close in time to when the first switch 130 is turned off. This can reduce the delay-caused current error in the switching regulator.

When the output signal of the level shifter 172 is asserted, the storage element 180 can store a voltage related to the inductor current generated by the sense current source 162 to sample the output current through the output circuit element 150. Then when the output of the level shifter 172 is de-asserted, the storage element 180 can stop sampling and hold the voltage related to the sensed inductor current at a level just prior to the output of the level shifter 172 being de-asserted. This sampling process can obviate the need to have a high speed comparator for the current limiting comparator 166, such that comparators having lower quiescent current levels can advantageously be used.

The compare circuit 184 can compare the sampled indication of current flowing through the output circuit element 150 that is stored by the storage element 180 with a reference current generated by the reference current source 182, which can be converted from a current to a voltage for the comparison. The reference current can set a maximum target output current for the switching regulator 100. The compare circuit 184 can generate an output indicative of whether the sensed current flowing through the output circuit element 150 is greater than the reference current. The output of the compare circuit 184 can be provided to the current adjustment circuit 186.

The current limit threshold can be adjusted based on whether the sensed inductor current is greater than a target current. When the output of the compare circuit 184 indicates that the sensed current is greater than the reference current and the current adjustment circuit 186 is enabled, the current adjustment circuit 186 can decrease the current limit threshold. When the output of the compare circuit 184 indicates that the sensed current is less than the reference current and the current adjustment circuit 186 is enabled, the current adjustment circuit 186 can increase the current limit threshold.

The enabled or disabled state of the current adjustment circuit 186 can be controlled by the output of the current limiting comparator 166. For example, the current adjustment circuit 186 can be enabled when the output of the current limiting comparator 166 indicates that the sensed current is greater than a current limit threshold, and can be not enabled otherwise. This can indicate that the current limiting comparator 166 is limiting the current provided to the load via the output circuit element 150 to the current limit threshold. As such, the current adjustment circuit 186 can adjust the current limit threshold when the current limiting comparator 166 is limiting current flowing through the output circuit element 150.

When the current adjustment circuit 186 is not enabled, the threshold current generated by the current source 164 can remain approximately the same. In this way, when the current limiting comparator 166 is not limiting the current flowing through the output circuit element 150 by the current limit threshold, the current limit threshold can remain approximately the same. Accordingly, the current adjustment circuit 186 can avoid burning excess power when the current limit threshold is not limiting current.

The second control circuit 120 can control whether the second switch 140 is either fully conducting or switched off. The second control circuit 120 can monitor an indication of the current output to the load via the second switch 140 generated by the optional sense circuit 154 and compare the indication to a reference, such as a reference current. The optional sense circuit 154 can be implemented similar to the sense circuit 152 and can optionally be used in combination with the sense circuit 152 or alternatively to the sense circuit 152. The second control circuit 120 can be implemented in accordance with the principles and advantages described with reference to the first control circuit 110, adjusted sensing near VSS instead of VDD. For example, the sense circuit 154 can correspond to a current mirror implemented with NMOS transistors. In one embodiment, the sense circuit 154 is implemented with two current mirrors, a first current mirror with NMOS transistors to mirror the output current, and a second current mirror with PMOS transistors to further mirror the current to provide the current as an input to the sense current source 162. Scaling of transistors to scale the mirrored currents can again apply. Of course, the current sources can also be implemented as current sinks, both of which are termed herein current sources, which, in one embodiment, can obviate the need to use level shifters. For timing, the output of the sense circuit 154 should be sampled right after the switch 140 has turned on in order to sample the peak current through the output circuit element 150.

The principles and advantages described herein with reference to current limiting can also be applied in the context of detecting when current flowing through the output circuit element 150 changes sign. For instance, a zero crossing comparator can detect when the alternative current (AC) output current of the switching regulator 100 changes polarity. In such a zero crossing comparator, an output can change state each time the AC output current changes in polarity. The zero cross comparator can be included in the second control circuit 120. In certain implementations, the zero cross comparator can operate at a relatively low voltage. According to some of these implementations, level shifters similar to the level shifters 170 and 172 may not be needed for zero cross detection or may operate at similar voltage potentials.

Figure 2:
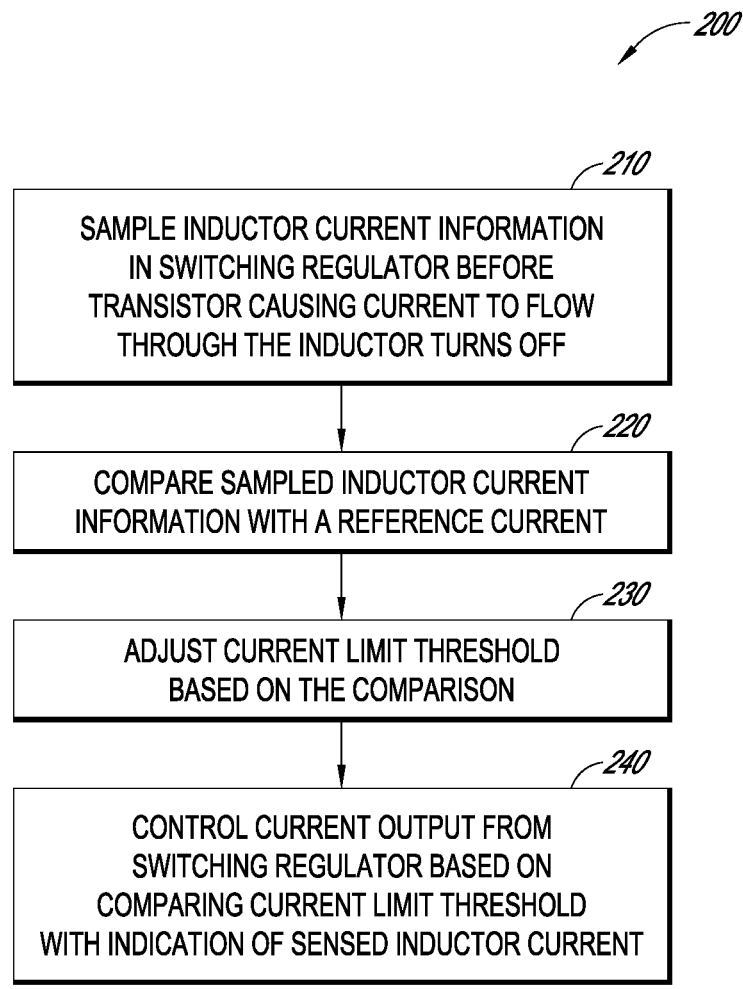
FIG. 2 is a flow diagram of an illustrative process of controlling a current output form a switching regulator according to an embodiment.

FIG. 2 is a flow diagram of an illustrative process 200 of controlling a current output form a switching regulator according to an embodiment. The process 200 can be implemented by any of the switching regulators described herein, such as the switching regulators of FIGS. 1 and 3. The process 200 can accurately and efficiently limit current output form a switching regulator. For example, the process 200 can provide an output current from a switching regulator while consuming a relatively low amount of quiescent current. As another example, the process 200 can reduce and/or minimize a current error caused by a propagation delay of a current limiting comparator. In some embodiments, the process 200 can reduce the size of an external inductor of the switching regulator that provides current to a load.

At block 210, inductor current information can be sampled in the switching regulator. The inductor current information is indicative of how much current is provided to a load via the inductor of the switching regulator. This sampling can occur relatively shortly before a transistor, such as the first switch 130, configured to cause current to flow through the inductor to the load is turned off or, alternatively, shortly after a transistor, such as the second switch 140, is turned on. By sampling close in time to which the transistor turns off, the sample can accurately sense the peak current flowing through the inductor. The sampling can occur when a control signal is asserted. For instance, the control signal can cause the switch 178 to pass a voltage associated with the current from the sense current source 162 to a storage element, such as the storage element 180. The control signal can be a relatively short pulse in certain implementations.

Figure 3:
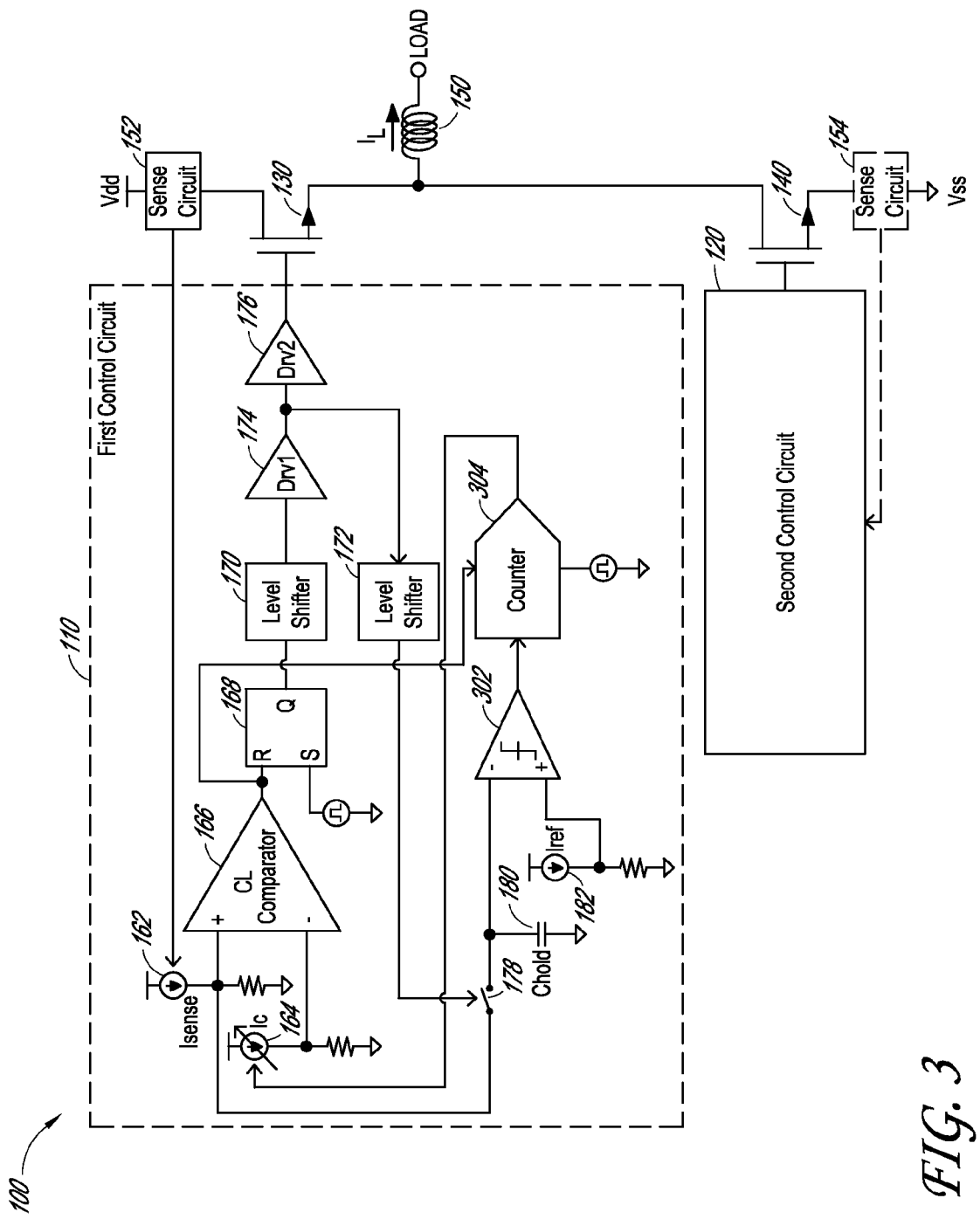
FIG. 3 is a circuit diagram of another embodiment of a switching regulator.

The sampling can occur substantially independently of a propagation delay of a current limiting comparator. In some instances, the sampling can occur substantially independently of a propagation delay of a current limiting comparator and at least one additional circuit element in a data path between the current limiting comparator and the inductor that provides current to the load. For example, as illustrated in FIGS. 1 and 3, when the first switch 130 is switched on, it can be switched off in response to the output from the latch 168 propagating to gate of the first switch 130 via the level shifter 170 and the drivers 174 and 176. The control signal provided to the switch 178 can be generated based on an output from the driver 174 that is subsequently shifted to a lower voltage by the level shifter 172. This can remove a propagation delay from the current limiting comparator 166, low voltage to high voltage level shifter 170, and driver 174 in providing the control signal to the switch 178, and consequently in sampling the inductor current information. In this way, the control signal can be applied to the switch 178 close in time to when the first switch 130 turns off. Accordingly, the inductor current information can be sampled close in time to when the first switch 130 is turned off and substantially independently of the propagation delay of the current limiting comparator 166. As such, a relatively low speed comparator that consumes a relatively small quiescent current can be used to implement the current limiting comparator 166 in certain embodiments. Such a comparator should not substantially contribute to current error resulting from propagation delay in sampling inductor current information.

The sampled inductor current information can be compared to a reference current at block 220. Such a comparison can be performed, for example, by a comparator or a preamplifier. Based on the comparison, a current limit threshold can be adjusted at block 230. For instance, when the comparison at block 220 indicates that the sensed inductor current is greater than the reference current, the current limit threshold can be reduced at block 230. As discussed earlier, the sensed inductor current can be a scaled version of the actual inductor current. On the other hand, when the comparison at block 220 indicates that the sensed inductor current is less than the reference current, the current limit threshold can be increased at block 230. In some instances, the adjustment at block 230 can be disabled when certain conditions are detected. For example, when no current limit is detected to have occurred in a previous clock cycle, the adjustment can be disabled. In this way, adjustment can be disabled when one or more conditions indicate that no adjustment is needed.

The current output from the switching regulator can be controlled at block 240. The adjusted current limit threshold can be compared with inductor current information, such as a voltage generated from a current output from the sense current source 162, to determine whether to limit the current output from the switching regulator via the inductor. In one embodiment, a signal generated by this comparison can subsequently be latched, level shifted up a higher voltage level, buffered by one or more drivers, and then provided to a control terminal of a transistor that causes current to flow through the inductor. Accordingly, comparing the adjusted current limit threshold with inductor current information can control the output current of the switching regulator.

The switching regulator 100 of FIG. 1 can be implemented in a number of different ways. FIG. 3 is a circuit diagram of another embodiment of a switching regulator 100. In the switching regulator 100 shown in FIG. 3, the compare circuit 184 of FIG. 1 is implemented as a comparator 302 and the current adjustment circuit 186 of FIG. 1 is implemented as a counter 304. Otherwise, the switching regulator 100 of FIG. 3 is substantially identical and/or functionally similar to the switching regulator 100 of FIG. 1.

The comparator 302 can be an analog voltage comparator. To help make the comparisons, the currents can be converted to voltages by resistances. The comparator 302 can generate an output signal indicative of which of the reference current or the sampled inductor current is greater. The sampled inductor current can be scaled from the actual inductor current. For instance, the comparator 302 can generate a logic 1 voltage when the reference current is greater than the sampled inductor current and the comparator 302 can generate a logic 0 voltage when the reference current is less than the sampled inductor current.

The counter 304 can receive the output of the comparator 302 and adjust the output count of the counter 304 accordingly. For instance, the counter 304 can increment its output when the comparator 302 output indicates that the reference current is greater than the sensed inductor current. In this example, the counter 304 can decrement its output when the comparator 302 output indicates that the reference current is less than the sensed inductor current. The counter 304 can adjust its output each clock cycle when it is enabled. The counter 304 can be any suitable counter circuit. For example, the counter 304 can be implemented by digital logic. The output of the counter 304 can control the current limit threshold. As illustrated in FIG. 3, the current source 164 can be adjustable based on the output of the counter 304. For example, the current source 164 can include a plurality of transistors in parallel for sourcing current, and one or more of the transistors can be enabled/disabled based on the count. The counter 304 can be disabled in response to the current limiting comparator 166 not limiting current, for example in a previous clock cycle. Accordingly, the counter 304 can be disabled when the current limit threshold is not being used to limit current. In this way, power need not be consumed adjusting the current limit threshold when the output current of the switching regulator being provided to the load is not being limited by the current limit threshold. In an alternative embodiment, a digital-to-analog converter can be used to convert the count from the counter 304 to a voltage, which is provided as an input to the inverting input of the current limiting comparator 166 in lieu of the current limit threshold current source 164 and the resistor.

In another embodiment, the compare circuit 184 of FIG. 1 can be implemented by a preamplifier and the current adjustment circuit 186 of FIG. 1 can be implemented by an analog-to-digital converter. A digital-to-analog converter can convert an output of the analog-to-digital converter to a current limit threshold for the current limiting comparator 166 or can provide a voltage output to replace the combination of the current limit threshold current source 164 and the resistor. Using a preamplifier and an analog-to-digital converter can adjust the current limit threshold by a larger amount in one clock cycle than the comparator 302 and the counter 304 of FIG. 3. For example, the counter 304 can increment the current limit threshold by one increment in the counter output in a clock cycle and the analog-to-digital converter can increment the current limit threshold by more than one increment in a clock cycle.

Figure 4A:
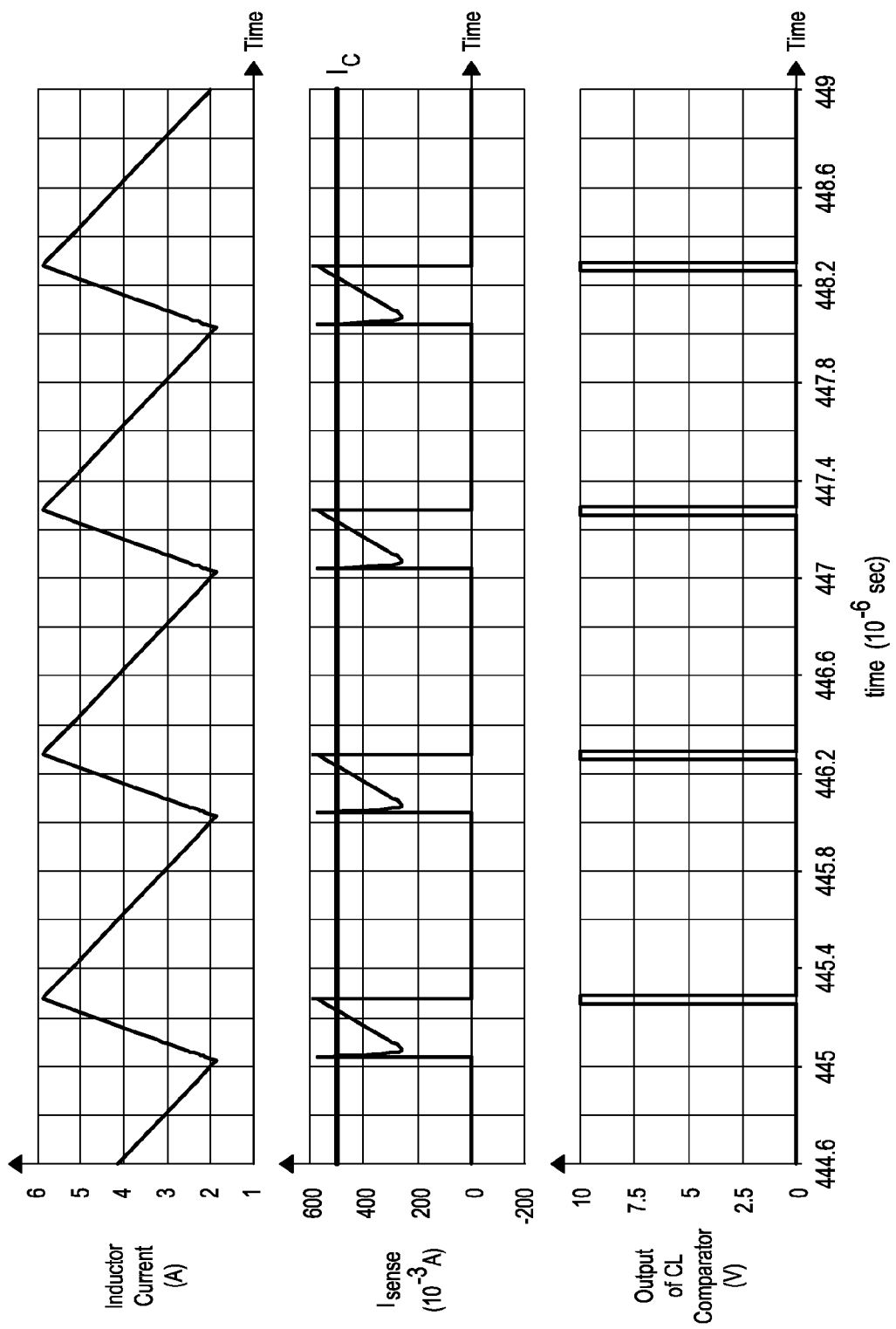
FIG. 4A shows example graphs related to suboptimal operation of a switching regulator.

FIGS. 4A-D show some improvements of one implementation of the switching regulator 100 of FIG. 3 compared to a previous switching regulator. FIG. 4A shows example graphs related to suboptimal operation of a previous switching regulator when the previous switching regulator is limiting current provided to a load. In this case, the switching regulator is configured to limit the current provided to a load to a maximum target current of about 5 amperes (A). In the inductor current graph of FIG. 4A, the output current of the switching regulator provided to a load goes up to about 6 A even though the switching regulator is configured to limit the current provided to the load at about 5 A. The increase in output current above a maximum target current limit is understood to be due to the speed the of current limiting comparator and the propagation delay in the signal path from the inputs of the current limiting comparator to the first switch that causes current to pass through the inductor to the load. The sensed inductor current graph of FIG. 4A shows that the sensed inductor current $I_{SENSE}$ is exceeding the threshold current limit $I_C$ when providing the current to the load as shown in inductor current graph. The sensed inductor current $I_{SENSE}$ going above and threshold current limit $I_C$ can be referred to as current overshoot. The current limiting comparator output graph of FIG. 4A shows that the output of a current limiting comparator corresponding the other graphs of FIG. 4A. The output of the current limiting comparator indicates that the current limiting comparator is operating in a current limiting mode to limit inductor current in four successive clock cycles.

Figure 4B:
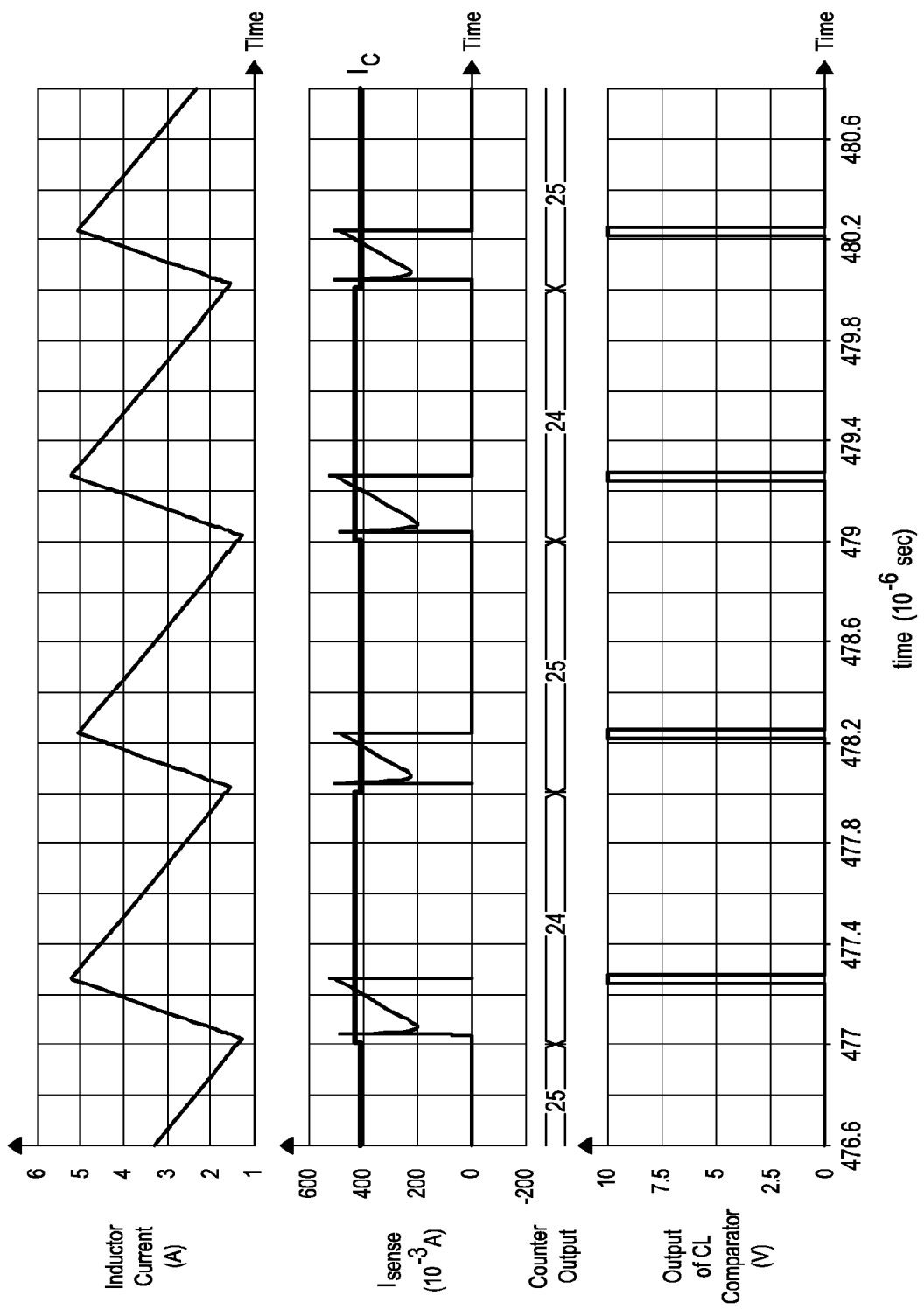
FIGS. 4B-4D show example graphs related to the operation of one implementation of the switching regulator of FIG. 3.
Figure 4C:
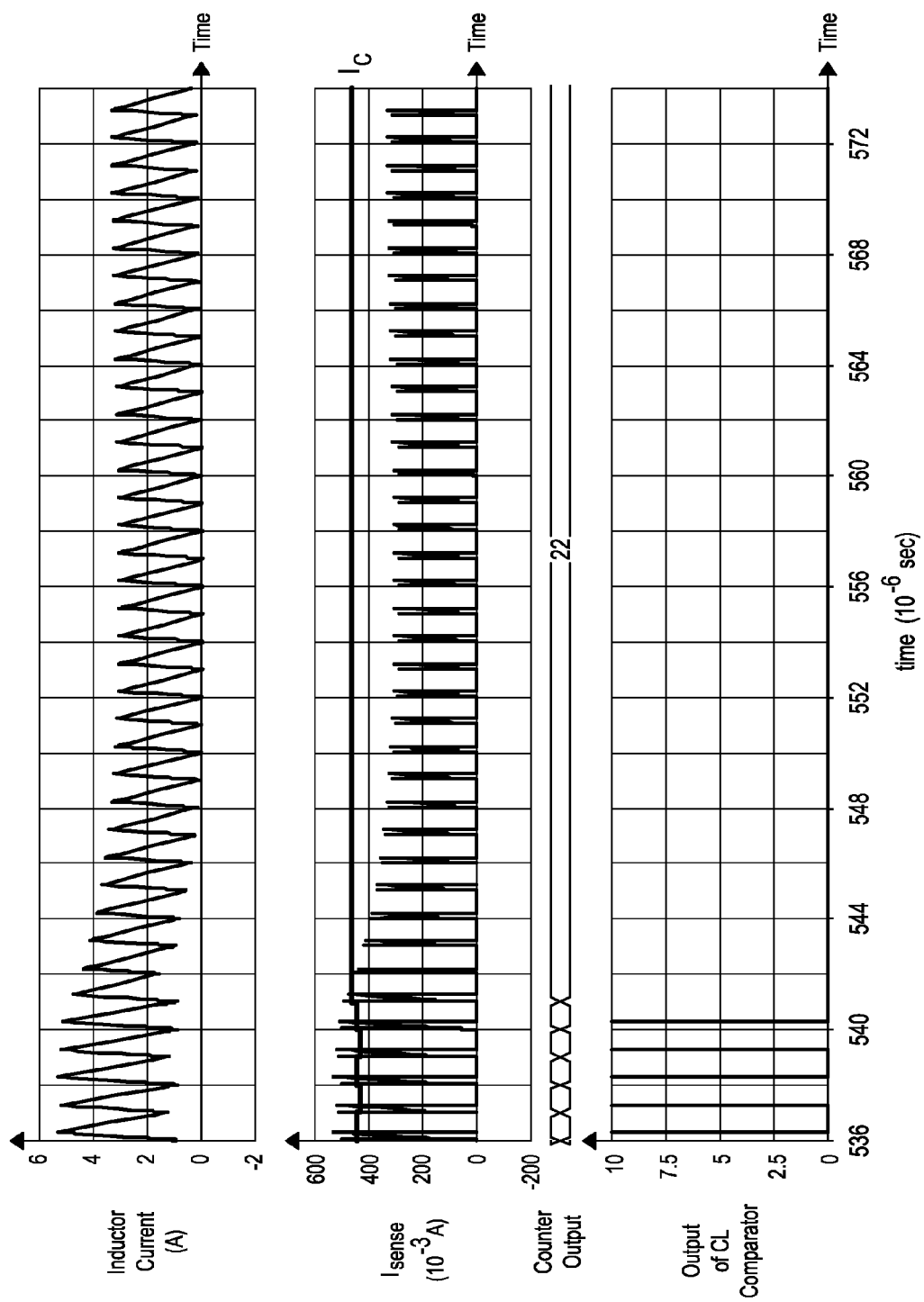
Figure 4D:
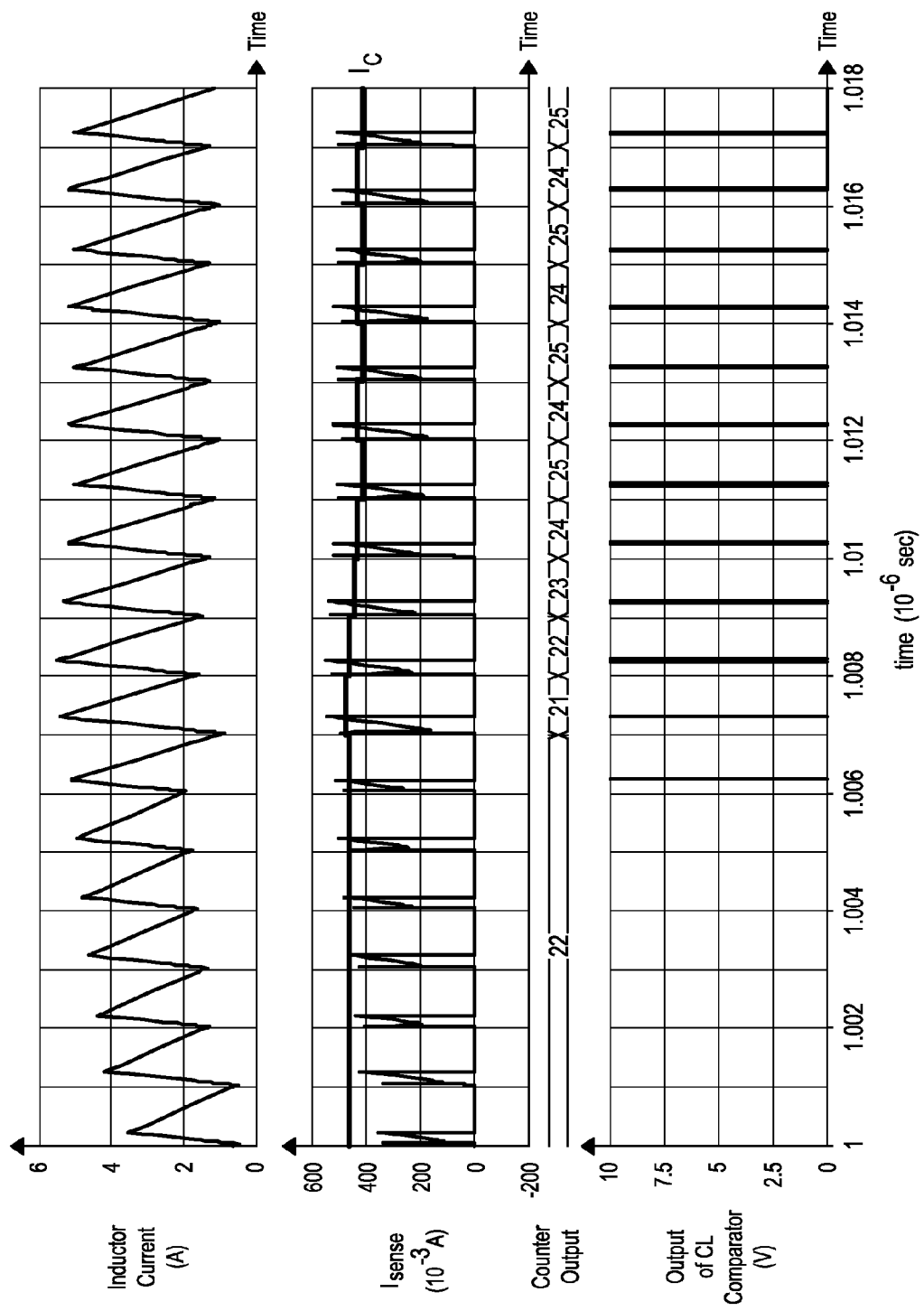

FIGS. 4B-4D show example graphs related to the operation of one implementation of the switching regulator 100 of FIG. 3. The graphs in FIG. 4B correspond to the switching regulator 100 attempting to limit output current provided to a load to 5 A. As such, in FIG. 4B, the switching regulator 100 is operating in a current limiting mode to limit output current. The inductor current graph of FIG. 4B shows that the inductor current for the switching regulator is closer to the 5 A target compared to the corresponding graph of FIG. 4A. The sensed inductor current graph of FIG. 4B shows that the current limit threshold is closer to about 400 mA, instead of about 500 mA in the corresponding graph of FIG. 4A. In addition, the overshoot current in FIG. 4B goes to a lower maximum current that the corresponding graph is FIG. 4A. The current limit threshold $I_C$ in FIG. 4B is adjusted by the counter output of the counter 304 of FIG. 3. The counter output can be a binary code used to set the current limit threshold. As shown in FIG. 4B, the counter output can reach a dynamic stable point when the current is being limited by the current limiting comparator 166. In particular, FIG. 4B shows that the counter output can switch between 24 and 25 to adjust the current limit threshold $I_C$ when the current limiting comparator 166 is limiting output current of the switching regulator. The counter output shown in FIG. 4B changes once per clock cycle. In some other embodiments, the counter output can change at different intervals of time. For example, the counter output can change once per two clock cycles. This can, for example, provide the comparator 302 more time to perform a comparison. The counter output can be adjusted upwards when the inductor current is less than a reference current $I_{REF}$ in FIG. 3. Similarly, the counter output can be adjusted down when the inductor current is greater than the reference current $I_{REF}$ in FIG. 3. Accordingly, when the inductor current in FIG. 4B goes above 5 A, the counter output is incremented up and the current limit threshold is decreased. This can cause the next peak on the inductor current graph to be lower. Then the count can be decreased and the current limit threshold can be increased. This dynamic stable state operation can efficiently limit current provided from the switching regulator.

FIG. 4C shows one implementation of the switching regulator 100 of FIG. 3 transitioning from a first mode in which it is limiting output current to a second mode in which it is providing the output current without limiting current. FIG. 4C shows that when the switching regulator is not limiting current, the counter output can remain at the same value and the output of the current limiting comparator 166 can remain at the same value. This can prevent the counter 304 from burning excess power when the current is not being limited by the switching regulator.

FIG. 4D shows one implementation of the switching regulator 100 of FIG. 3 transitioning from the second mode in which it is providing the output current without limiting current to the first mode in which it is limiting output current. When the sensed inductor current $I_{SENSE}$ overshoots the current limit threshold Ic, the counter 304 can be enabled. Then the counter output can cause the current limit threshold $I_C$ to be adjusted. This can fine tune the current limit threshold $I_C$ when the current limit threshold $I_C$ is being used to limit the inductor current. As shown in FIG. 4D, the counter output can reach a dynamic stable point when the switching regulator is limiting current provided to a load via an inductor. Similarly, the current limit threshold $I_C$ can also have a dynamic stable point, as shown in FIG. 4D.

In the embodiments described above, apparatus, systems, and methods for limiting a current provided by a switching regulator to a load are described in connection with particular embodiments. It will be understood, however, that the principles and advantages of the embodiments can be used for any other systems, apparatus, or methods with a need for accurately and/or efficiently limiting a current. Moreover, it will be understood that any of the features described herein with reference to limiting a current, can alternatively or additionally be applied to avoiding and/or minimizing undercurrents and/or currents of an opposite polarity. Furthermore, the principles and advantages described herein may be applied to limiting voltage.

Such methods, systems, and/or apparatus can be implemented into various electronic devices. Examples of the electronic devices can include, but are not limited to, consumer electronic products, parts of the consumer electronic products, electronic test equipment, medical electronic products, etc. Examples of parts of consumer electronic products can include analog-to-digital converts, amplifiers, rectifiers, programmable filters, attenuators, variable frequency circuits, etc. Examples of the electronic devices can also include memory chips, memory modules, circuits of optical networks or other communication networks, and disk driver circuits. The consumer electronic products can include, but are not limited to, wireless devices, a mobile phone (for example, a smart phone), cellular base stations, a telephone, a television, a computer monitor, a computer, a hand-held computer, a tablet computer, a personal digital assistant (PDA), a microwave, a refrigerator, a stereo system, a cassette recorder or player, a DVD player, a CD player, a digital video recorder (DVR), a VCR, an MP3 player, a radio, a camcorder, a camera, a digital camera, a portable memory chip, a washer, a dryer, a washer/dryer, a copier, a facsimile machine, a scanner, a multi function peripheral device, a wrist watch, a clock, etc. The medical electronic products can include, but are not limited to, a Digital-X-ray detector, a CT (Computed Tomography) scanner, an Ultrasounds system, a MRI (Magnetic Resonance Imaging) system, etc. Further, the electronic device can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected). Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The teachings of the inventions provided herein can be applied to other systems, not necessarily the systems described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods, apparatus, and systems described herein may be embodied in a variety of other forms. Furthermore, various omissions, substitutions and changes in the form of the methods, apparatus, and systems described herein may be made without departing from the spirit of the disclosure. The accompanying claims and their equivalents are intended to cover such forms or modifications as would fall within the scope and spirit of the disclosure.

What is claimed is:
1. An electronically-implemented method of current limiting, the method comprising:
sampling a signal associated with an inductor current of a switching regulator to generate a sampled level, wherein timing of sampling is performed relative to one of switching on or off of a transistor configured to pass current through an inductor to a load, and wherein said sampling is performed while current flowing through the inductor is increasing;

adjusting a current limit threshold based at least partly on a comparison between the sampled level and a reference level;

comparing the signal to the current limit threshold using a current limiting comparator;

generating a control signal based on a node in a signal path between the current limiting comparator and a control terminal of the transistor, wherein there is at least one intervening circuit element between the current limiting comparator and the node in the signal path, and wherein said sampling occurs when the control signal is asserted; and limiting an output current of the switching regulator based at least partly on said comparing.

2. The method of claim 1, further comprising disabling at least a portion of a current adjustment circuit configured to perform said adjusting, in response to detecting that the output current of the switching regulator is not being limited based on the current limit threshold.

3. The method of claim 1, wherein said adjusting and said limiting cause the switching regulator to operate in a dynamic stable state to limit the output current of the switching regulator.

4. The method of claim 1, further comprising latching data indicative of a result of the comparison between the sampled level and the reference level in a clock cycle after said adjusting.

5. The method of claim 1, wherein the at least one intervening circuit element comprises at least one of a level shifter or a driver.

6. The method of claim 1, wherein the sampled level is stored via a capacitive circuit element.

7. The method of claim 1, wherein the transistor is electrically connected to Vdd.

8. A switching regulator comprising:
a current limiting comparator configured to perform a comparison of a current limit threshold with an indication of current passing through an output circuit element of the switching regulator, wherein the current limiting comparator is configured to cause the current passing through the output circuit element of the switching regulator to be limited based on the comparison;
a compare circuit configured to compare a reference current with a stored indication of current flowing through the output circuit element;
a current adjustment circuit configured to adjust the current limit threshold based on an output of the compare circuit; and
a storage element configured to store the indication of the current flowing through the output circuit element when current flow through the output circuit element is increasing and when a control signal is asserted wherein the control signal is generated based on a node in a signal path between the current limiting comparator and the output circuit element, and wherein at least one intervening circuit element is between the current limiting comparator and the node in the signal path.

9. The switching regulator of claim 8, wherein the switching regulator comprises a buck converter.

10. The switching regulator of claim 8, further comprising a switch configured to selectively enable the storage element to store the indication of current passing through the output circuit element based on the control signal.

11. The switching regulator of claim 10, further comprising a level shifter and a driver in the signal path, wherein the at least one intervening circuit element comprises the level shifter and the driver.

12. The switching regulator of claim 11, further comprising a second level shifter disposed in an electrical path between the node and the switch.

13. The switching regulator of claim 8, wherein the current adjustment circuit comprises at least one of a counter or an analog-to-digital converter.

14. The switching regulator of claim 8, further comprising:
a state element configured to latch an output of the current limiting comparator;
a level shifter configured to increase a voltage level of an output of the state element, wherein the at least one intervening circuit element comprises the state element and the level shifter; and
one or more drivers configured to receive an input from the level shifter and control activation of the transistor that is configured to cause current to pass through the output circuit element.

15. The switching regulator of claim 8, wherein the current adjustment circuit is configured to generate an output with a dynamic stable state to cause current passing through the output circuit element to be limited.

16. The switching regulator of claim 8, wherein the output circuit element comprises an inductor.

17. The switching regulator of claim 8, further comprising a level shifter in the signal path, wherein the at least one intervening circuit element comprises the level shifter.

18. The switching regulator of claim 8, further comprising a level shifter and a driver in the signal path, wherein the at least one intervening circuit element comprises the level shifter and the driver.

19. A switching regulator comprising:
a current limiting comparator configured to perform a comparison of a current limit threshold with an indication of current passing through an output circuit element of the switching regulator, wherein the current limiting comparator is configured to cause the current passing through the output circuit element of the switching regulator to be limited based on the comparison;
a compare circuit configured to compare a reference current with a stored indication of current flowing through the output circuit element;
a current adjustment circuit configured to adjust the current limit threshold based on an output of the compare circuit, wherein the current adjustment circuit is configured to be disabled in response to the current limiting comparator generating an output signal indicative of the current limit threshold being greater than the indication of current flowing through the output circuit element; and
a storage element configured to store the indication of the current flowing through the output circuit element when a control signal is asserted, wherein the control signal is generated based on a node in a signal path between the current limiting comparator and the output circuit element, and wherein at least one intervening circuit element is between the current limiting comparator and the node in the signal path.

* * * * *